United States Patent [19] [11] 4,136,331
Cullen [45] Jan. 23, 1979

[54] SPEED-CONTROL SYSTEM FOR AN ENGINE-POWERED VEHICLE

[76] Inventor: James H. Cullen, 1251 N. Harding Ave., Chicago, Ill. 60651

[21] Appl. No.: 803,609

[22] Filed: Jun. 6, 1977

Related U.S. Application Data

[63] Continuation-in-part of Ser. No. 711,278, Aug. 3, 1976, abandoned.

[51] Int. Cl.² .............................................. B60Q 1/54
[52] U.S. Cl. ...................................... 340/53; 340/63; 340/670; 180/110
[58] Field of Search .......................... 340/53, 62, 263; 180/105 R, 105 E, 106, 110

[56] References Cited

U.S. PATENT DOCUMENTS

| | | | |
|---|---|---|---|
| 2,452,344 | 10/1948 | Addorisio | 340/62 |
| 2,831,546 | 4/1958 | Henderson | 340/53 X |
| 3,732,539 | 5/1973 | Easterly | 340/62 |

Primary Examiner—Alvin H. Waring
Attorney, Agent, or Firm—Paul H. Gallagher

[57] ABSTRACT

The device includes a speedometer in an automobile, having a speed scale and a pointer; the speedometer has photo-electric means and a shield on the pointer to interrupt the light rays in the photo-electric means, above a predetermined speed, for effecting warning signals or inhibiting excess speed; the PE arrangement eliminates mechanical contacts in the speedometer; the warning signals include external warning light viewable by others than those in the automobile such as other drivers and the traffic police, and includes a shifting down of automatic transmission, for reducing speed; other forms of the invention are adapted to industrial installations.

14 Claims, 8 Drawing Figures

U.S. Patent    Jan. 23, 1979    4,136,331
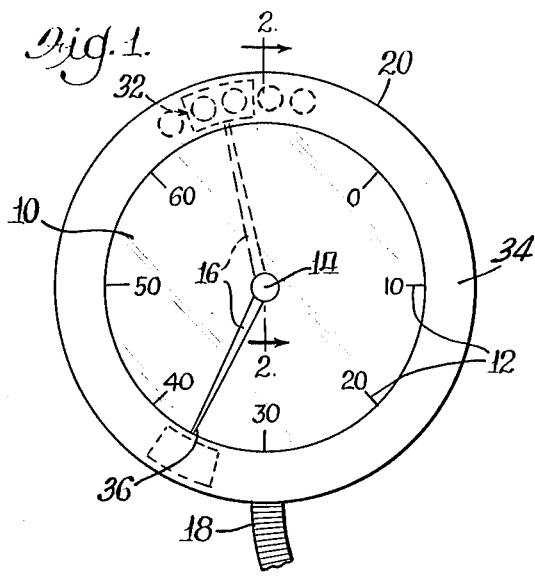
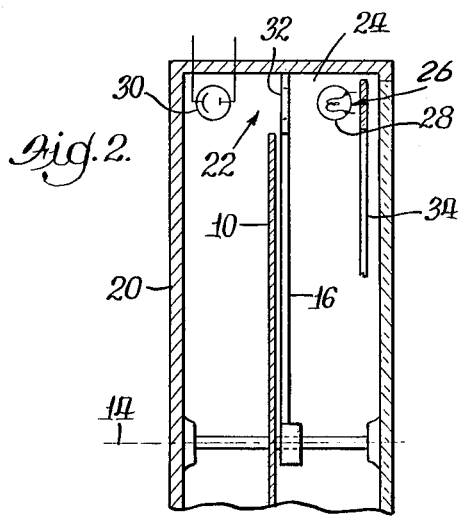
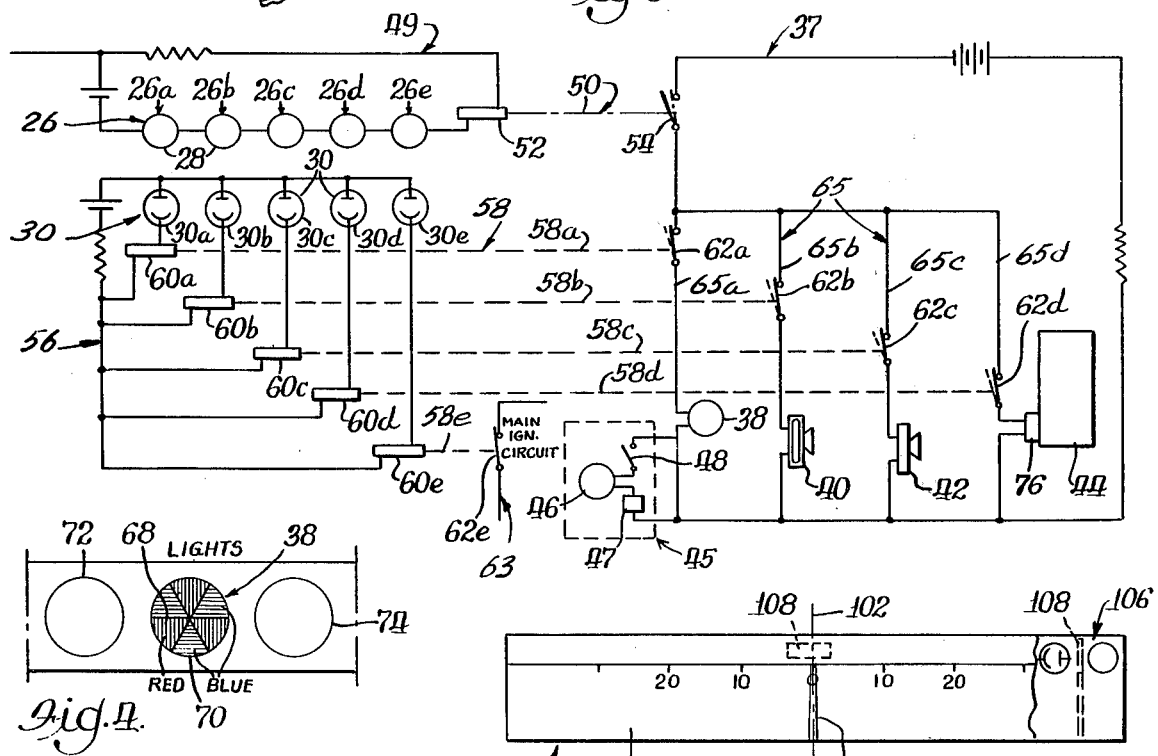
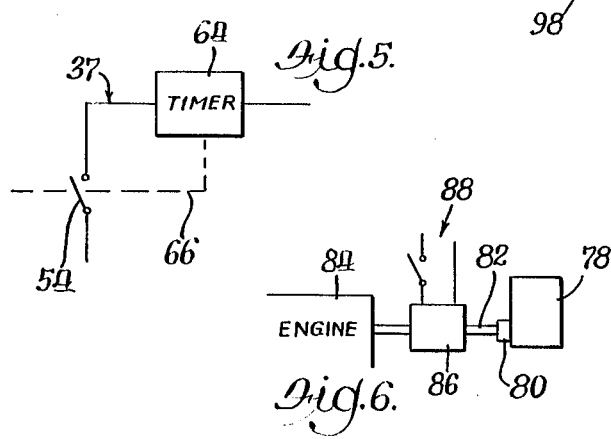
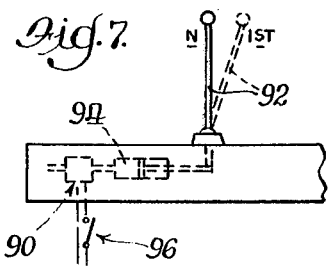

SPEED-CONTROL SYSTEM FOR AN ENGINE-POWERED VEHICLE

This application is a continuation-in-part of my co-pending application Ser. No. 711,278, filed Aug. 3, 1976, now abandoned.

OBJECTS OF THE INVENTION

A main and broad object of the invention is to provide speedometer control means in an automobile including novel signal and control operations such as providing a visual signal to others, outside the automobile in question, of excessive speed, and to shift down the automatic transmission upon further excessive speed.

Another and broad object is to provide apparatus of the foregoing general character especially adapted to speed control in an automobile, being incorporated in the speedometer thereof, the speedometer having a dial and a pointer exposed to the observer, and photo-electric means controlled by the indicator for in turn controlling electrical control components, thereby eliminating mechanical contacts in the speedometer; the speedometer further including novel construction for concealing the photo-electric means from the observer in the normal operation thereof and whereby the dial and pointer appear substantially the same as in other indicators of similar nature not having the photo-electric (PE) means.

Another object is to provide apparatus of the foregoing general character which includes a plurality of PE units for respectively producing control signals, in an arrangement wherein if all of the PE units are not properly functioning, the system of control signals is disabled, thereby eliminating random or uncontrolled operation of control signals.

An additional object is to provide apparatus of the foregoing general character which, while well adapted to an automobile, is of such nature that it can be also well adapted to other kinds of controls such as are used in industrial manufacturing operations.

DESCRIPTION OF A PREFERRED EMBODIMENT

In the drawings:

FIG. 1 is a face view of a speedometer of the kind usually used in automobiles and including features of the present invention:

FIG. 2 is a sectional view taken at line 2—2 of FIG. 1;

FIG. 3 is an electrical circuit including components or instrumentalities controlled by the speedometer;

FIG. 4 is a fragmentary face view of a novel light arrangement for use in automobiles, and adapted for providing signals to other people outside the automobile;

FIG. 5 is a view of a fragment of the circuit of FIG. 3 and including a timer component, forming a modified form of the invention;

FIG. 6 is another fragmentary view of another modified form, utilizing a different control device;

FIG. 7 is a fragmentary view of still another modified form utilizing a different control device; and FIG. 8 is a simplified view of a meter, similar in general character to a speedometer but of a different detail construction, for use with control instrumentalities of character other than automobiles.

Referring in detail to the drawings, FIGS. 1 and 2 show a speedometer for use in an automobile and of a general character that is known. The speedometer includes a dial plate 10 having graduated markings 12 representing miles per hour. The dial plate 10 is planar in shape and disposed transverse to a central axis 14, and the speedometer includes a pointer 16 mounted on a shaft on the axis 14 and sweeping over the dial in a plane parallel to the dial, cooperating with the graduations 12 for representing the miles per hour traveled, by the automobile. A drive cable 18 is also shown.

The speedometer includes a casing 20, but in this construction having a portion 22 of greater radius than the dial plate and providing a space 24 in which photo-electric (PE) means 26 is disposed. This PE means includes a plurality of units in this case five, individually identified 26a, 26b, 26c, 26d, 26e, each unit including a pair of elements, a light bulb 28 and a cell 30 aligned therewith.

The pointer 16 includes a shield or blocking element 32 affixed thereon, at its outer end, moving of course with the pointer, positioned for moving between the light bulbs and PE cells (FIGS. 1 and 3) for blocking the light rays therebetween and de-energizing the PE means. The units 28, 30 are spaced circumferentially around the speedometer at a suitable spacing to be referred to again hereinbelow and the shield 32 is of selected length equal to the circumferential reach of for example two units, so that it is capable in an advanced position of blocking any two adjacent cells at one time.

The speedometer is positioned in use with the front side shown in FIG. 1, presented to the observer. The casing 20 is provided with an annular plate or element 34 covering the light bulbs, and preferably extending circumferentially around the speedometer for good appearance. The inner edge of this annular plate may be substantially axially aligned with the outer edge of the dial plate 10 for appearance sake, and the dimensions of the various elements are effective not only for shielding or blocking the light bulbs from the observer, but the shield 32 also, so that the pointer 16 as presented to the observer, appears as an ordinary pointer; the outer end of the visible part of the pointer as indicated at 36 is preferably very fine.

FIG. 3 shows a main electrical circuit 37 directly controlled by the PE means and including a number of individual control signal means which are actuated at certain predetermined excessive speeds, those particular speeds, and the manner of the operation of the components, being described hereinbelow.

The circuit of FIG. 3 includes an indicating light 38, recorded audible message reproducing means 40, a horn 42 and a transmission 44. These instrumentalities 38, 40, 42, 44 are arranged parallel relative to each other in the circuit for individual energization, being in separate sub-circuits incorporated in the main circuit 37. Each of these instrumentalities 38, 40, 42, 44 is actuated in accordance with certain excessive speeds as referred to again hereinbelow.

As an alternate feature, electrical elements surrounded in the dot-dash rectangle 45 may be included with desired ones of the instrumentalities. For example, in the rectangle 45 are a signal light 46, a buzzer 47 and a manually actuated switch 48, these elements being in series, and together in parallel with the signal light 38. The signal light 38 is actuated automatically in a manner described hereinbelow and the elements in the rectangle 45 may selectively be actuated under the control of the driver, also as described hereinbelow.

The light bulbs 28 are included in a first sub-circuit 49 which also activates a first relay means 50, including a coil 52 in the sub-circuit and a normally open switch 54 in the main circuit 37. The light bulbs are arranged in series and when all of them are in place and functioning properly, the relay 50 is energized, closing the switch 54, and conditioning the main circuit 37 for energization. If any one of the light bulbs should be missing or defective, the relay 50 will be de-energized, opening the circuit 37, providing a fail safe feature, to prevent random or uncontrolled operation of the control instrumentalities.

The PE cells 30 are included in a second sub-circuit 56, these cells being individually identified 30a, 30b, 30c, 30d, 30e, each being connected with a respective one of a plurality of second relay means 58a, 58b, 58c, 58d, 58e, the relays including coils 60a, 60b, 60c, 60d, 60e, the coils actuating normally closed switches 62a, 62b, 62c, 62d, normally open switch 62e; switches 62a, 62b, 62c, and 62d are included respectively in third sub-circuits 65a, 65b, 65c, 65d which include the respective instrumentalities identified above 38, 40, 42, 44, while the switch 62e is included in the main ignition circuit 63, and functioning in a manner described below.

While in the present case the light bulbs 28 are arranged in series for the purpose stated, it will be understood that, instead of such arrangement, the PE cells 30 may be arranged in series for accomplishing that purpose, the particular arrangement utilized being a matter of choice. Similarly, the sub-circuits 49, 56, and relays 50, 58 may be reversed in action relative to the present arrangement utilized, e.g., normally closed switches instead of normally open, and vice versa, energizing instead of de-energizing, and vice versa, etc. Such selective control functions of PE means and related instrumentalities, and their reverse operations, are well known.

If desired, and as an alternate arrangement, a timer may be incorporated as in FIG. 5. In this arrangement, the main circuit 37 includes a timer 64 energized by the circuit, and including a connection 66 with the relay switch 54 and operative upon expiration of a predetermined time for opening that switch. This kind of timer, and its function, are well-known. By the use of the timer, if a signal or control function is initiated it will be terminated at the expiration of a predetermined time, if the operator does not otherwise terminate it, whereby to eliminate unnecessary prolonged actuation of the signal.

In accordance with a principal feature of the invention, the light 38 is positioned on the exterior of the automobile, and is of a distinctive appearance, entirely different from all other lights in the automobile, this distinctiveness being provided as indicated in FIG. 4, by a plurality of alternate streaks of color such as red 68 and blue 70. It is preferred that it also be a flasher. This light may be disposed adjacent other lights such as head light 72 and parking light 74, so that when observed by persons other than the occupants of the automobile, such as those in adjacent automobiles and traffic police, those other persons will be informed of the excessive speed condition indicated by the light.

While the signal light 38 is actuated automatically upon a certain predetermined speed being reached, as described below, and that light is not observable to the driver, the driver may wish to have a visual signal for his own attention indicating that the light 38 is lighted. In this situation the elements in the rectangle 45 may be utilized, i.e., the switch 48 manually closed by the driver and the light 46 is disposed in the interior of the car in position for ready observation by the driver, and the audible signal or buzzer 47 is also in the interior of the car and readily heard by the driver. Thus the driver will know that the signal light 38 has been lighted, but if desired he may leave the manually actuated switch 48 in open position so as not to actuate the elements 46, 47.

In a similar manner, such manually controlled elements as the light 46 and the buzzer 47 may be incorporated in conjunction with any of the additional signal producing means 40, 42, 44, where appropriate, and as desired, although in the case of the latter three such would generally not be utilized.

The instrumentality 40 may be a simple device having a recorded message, that plays back the message when it is energized; the instrumentality 42 is for example the horn usually provided in the automobile.

The instrumentality 44 as indicated above is a transmission and in the case of an automatic transmission, it is usually provided with a part 76 having a connection for connecting electrical conductors, and upon the provision of a suitable signal, the transmission will shift down, and the automobile will run slower. This of course is not merely a signal, but an enforced slow-down. This control would normally be actuated at a higher speed and after the others, the warning type signals, are actuated. An example of such transmission is represented by, among many others, Buick Super Turbine 300, a pictorial representation thereof being shown on page 2-300 of "Motor Auto Repair Manual 1976", and in that representation is a part labelled "Downshift Solenoid Terminal" which corresponds with the part 76 in FIG. 3 herein.

In the driving of the automobile, and while it is operating within the approved speed, which in the present case is arbitrarily indicated at 60 mph, nothing will take place in the way of the controls represented in FIG. 3, although the switch 54 will be closed. Upon the pointer 16 passing the point of 60 mph, the shield 32 will block the light rays in the PE means, each unit successively, starting with the first one 28a, 30a; this will close the switch 62a energizing the light 38; upon reaching higher speed the shield will encounter the second PE means 28b, 30b and the next switch 62b is closed, energizing the component 40. This procedure continues, successively energizing the components 42 and 44.

Upon still greater speed being reached, the relay 58e is actuated, enabling the normally open switch 62e to open, which is included in the main ignition circuit. This feature may be incorporated in the use of a manual transmission, as distinguished from an automatic transmission, so that upon the corresponding excessive speed being reached, the main ignition is disabled causing the automobile to coast and thus slow down, in a manner similar to the actuation of the switch 62d associated with the transmission 44.

The PE means 26 are spaced apart circumferentially throughout a range representing the range of speed beyond the normal and approved speed as desired, such as totaling a range of 5 mph, 10 mph, etc.

The shield 32 may be of any desired circumferential extent, but preferably on the order of the span of two PE units. In such an arrangement the light 38 will first be actuated, then if the speed increases the component 40 will be actuated, and the two units 38, 40 thereby actuated together. Assuming that a still greater speed is reached, the component 42 is actuated, but the signal light 38 may become de-activated, but the de-activation of any such anteriorly activated components is inconsequential in view of the activation of the next succeeding ones.

It is preferred that the instrumentalities 38, 40, 42, 44 be operated serially, respective ones being successively operated upon the automobile reaching higher speeds. There is no necessary order of their arrangement, that being as preferred, although it is preferred to have the transmission shifted down and the disabling of the main ignition circuit take place as the last ones of the operations.

Various other instrumentalities of the automobile may also be used in the speed control operation, such as the following.

FIG. 6 shows an automatic transmission 78 having a component 80 operated by vacuum control for shifting it down. A tube 82 leads from the engine 84, and includes an actuator 86 controlled by the speedometer through an electric element 88. When the vacuum condition exceeds a predetermined value in response to greater speed of the engine, the transmission will be shifted down under the control of the speedometer. Such transmission and vacuum control are known.

FIG. 7 shows a manually controlled, or stick shift, transmission 90 having a shift lever 92. A hydraulic cylinder/piston device 94 under the control of the speedometer through a circuit element 96, is operative for shifting the lever from any driving position, such as first drive as shown in dot-dash lines, to neutral as shown in full lines.

FIG. 8 shows the features of the invention applied to a meter 98 which is distinguished from the usual automobile speedometer by being disposed horizontally, that is, it has a circular dial strip 100 mounted on a vertical axis 102, with a pointer 104. The dial strip 100 has a surface extending axially, with indicating markings extending generally parallel with the axis, and the pointer also extends generally parallel with the axis. The arrangement is that in the relative movement between the dial member and the pointer, the movable member moves circumferentially around the axis 102. In this arrangement the PE means 106 includes light bulbs and cells arranged similarly to the PE means 26 referred to above, and the pointer has a shield 108 which moves between the light bulbs and PE cells.

The meter means 98 of FIG. 8 is of a type that is used in many installations in industry, such as for example as in plastic molding machinery. When a certain point is reached, in the control of a function, the pointer 104 moves beyond the indications of a predetermined maximum range, and controls are effected by the PE means.

A great advantage of the invention is that the arrangement will serve the same purpose as, and may be used instead of, the devices, such as governors, found in some modern cars for limiting their speed.

While the invention is well adapted to automobiles, and may be most commonly used in that connection, the functions in that case are produced for controlling the speed. However speed as such may not be a function that is to be controlled in other installations, and the function of all such instrumentalities is herein defined as "a continuing function" and the operation of the apparatus is to indicate the intensity of that function. This expression is used in the specification and claims herein with such generic meaning.

I claim:

1. Apparatus for producing control signals in an automobile having a speedometer, the speedometer having a dial with a speed-indicating scale thereon and a pointer movable over the dial, and the pointer having a first range of movement to indicate normal speed and a second range of movement beyond the first range to indicate excessive speed, said apparatus comprising, a main circuit including a plurality of control instrumentalities further characterized hereinbelow, the speedometer including visual blocking means beyond said scale, a series of PE means spaced along said scale in said second range behind said visual blocking means, each including a light bulb and a cell and the PE means being individually operatively associated with respective ones of said control instrumentalities, the pointer of the speedometer having a shield thereon behind said visual blocking means, movable in association with the PE means and operative thereby for producing control signals in the PE means, a first sub-circuit including said light bulbs in series with each other, the apparatus incorporating a first relay means which includes a coil in the first sub-circuit and a normally open switch in the main circuit, a second sub-circuit including said cells, the cells being parallel with each other, the main circuit including a plurality of third sub-circuits, each including a respective one of said control instrumentalities, the third sub-circuits being parallel with each other, but each in series in the main circuit, the apparatus including a plurality of second relay means each including a coil in circuit with and controlled by respective ones of said cells and a normally closed switch in a respective one of said third sub-circuits, said first sub-circuit being operative, in response to all of said light bulbs being energized, for energizing the first relay means, closing the switch therein and thereby conditioning the main circuit for energization, and upon disabling of any of the light bulbs, enabling that switch to move to open position, and thereby to open the main circuit, said PE means being serially arranged along said second range representing respectively increased speeds of said excessive speeds and the shield on said pointer controlling the PE means successively and in combination and thereby operative for energizing the respective control instrumentalities in successive manner whereby actuation of each control instrumentality indicates a corresponding excessive speed in said second range.

2. Apparatus according to claim 1 wherein said control instrumentalities are of successively greater intensity, such as first a light signal and second an indiscriminate sound signal and then a recorded intelligible message, and at times energizing plural instrumentalities simultaneously.

3. Apparatus according to claim 1 in conjunction with an automobile having an ignition circuit, and wherein said second relay means includes a particular relay means operatively associated with one of said PE means and includes a coil connected with that PE means and a normally open switch in the ignition circuit, and the last named PE means being operative for normally holding the corresponding switch closed and operative upon de-energization thereof by the shield on the speedometer pointer for enabling that switch to move to its normally open position.

4. Apparatus according to claim 1 and including a manually actuated control instrumentality actuatable with at least one of the first mentioned control instrumentalities whereby to provide an alternate and manually controllable signaling instrumentality correspondingly selectively observable by the driver of the automobile.

5. Apparatus according to claim 1 and including additional signal means actuatable with each of said control instrumentalities and positioned for observation by the driver of the atuomobile.

6. Apparatus according to claim 5 wherein said additional signal means includes a light in the interior of the automobile visually observable by the driver of the automobile.

7. Apparatus according to claim 6 wherein said additional signal means includes an audible signal in series with the light and actuated simultaneously therewith.

8. Apparatus according to claim 1 in conjunction with an automobile having standard exterior lights and wherein one of said control instrumentalities is in the form of light means, and said light means includes at least one light on the exterior of the car positioned adjacent to and readily distinguishable from said standard exterior lights.

9. Apparatus according to claim 8 wherein said light is a flasher.

10. Apparatus according to claim 1 in an automobile that includes an automatic transmission having a control element for shifting it down, and
said control element constitutes one of said control instrumentalities.

11. Apparatus according to claim 1 in an automobile that includes a manually shiftable transmission with a shift lever movable between a neutral position and speed position, said apparatus including,
means for shifting the shift lever from speed position to neutral position, and
said shifting means constitutes one of said control instrumentalities.

12. Apparatus according to claim 1 wherein,
the speedometer pointer is movable about an axis, and
the scale lies in a plane transverse to that axis, with elements radially directed and distributed angularly, and
the visual blocking means and the shield on the pointer are positioned radially beyond the scale.

13. Apparatus according to claim 1 wherein,
the speedometer pointer is movable about an axis, and
the scale lies in a cylinder concentric with that axis, with elements lying parallel with that axis and distributed circumferentially therearound, and
the visual blocking means and the shield on the pointer are positioned axially beyond the scale.

14. Apparatus according to claim 1 wherein at least one of said control instrumentalities constitutes a governor and operates to limit the speed of the automobile.

* * * * *